United States Patent [19]
Röhrs

[11] Patent Number: 5,692,598
[45] Date of Patent: Dec. 2, 1997

[54] CONVEYOR BELT COMPRISED OF FLEXIBLE, PARALLEL BELT LOOPS HAVING CONNECTED THERETO TRANSVERSELY EXTENDING RODS

[75] Inventor: Friederich Röhrs, Celle, Germany

[73] Assignee: Firma Gummi-Jäger KG GmbH & Cie, Hanover, Germany

[21] Appl. No.: 749,984

[22] Filed: Nov. 15, 1996

[51] Int. Cl.⁶ ............................................. B65G 15/54
[52] U.S. Cl. ............................................. 198/848
[58] Field of Search ........................ 198/817, 848; 209/393, 395; 171/112, 124, 130, 126

[56] References Cited

U.S. PATENT DOCUMENTS 4,653,632  3/1987  Timmer et al. ................ 198/848 X

FOREIGN PATENT DOCUMENTS

| 3338792 | 5/1985 | Germany | 198/848 |
| 0407167 | 8/1985 | Germany | 198/848 |
| 3406333 | 8/1985 | Germany | 198/848 |
| 3409639 | 9/1985 | Germany | 198/848 |

Primary Examiner—James R. Bidwell
Attorney, Agent, or Firm—Robert W. Becker & Associates

[57] ABSTRACT

A conveyor belt for a conveying device has pull-resistant, flexible belt loops extending in a direction of movement of the conveyor belt. Rods having opposed, flat ends are provided with bores. The rods extend perpendicularly to the belt loops and rest with the opposed flat ends on the belt loops. Fasteners for securing the flat ends to the belt loops by penetrating the bores of the flat ends and the belt loops are provided. The flat ends have a leading edge and a following edge in the direction of movement. The leading and the following edges have rounded projections in the area of the bores.

10 Claims, 1 Drawing Sheet

CONVEYOR BELT COMPRISED OF FLEXIBLE, PARALLEL BELT LOOPS HAVING CONNECTED THERETO TRANSVERSELY EXTENDING RODS

BACKGROUND OF THE INVENTION

The present invention relates to a conveyor belt for conveying devices, especially a screen conveyor belt for agricultural implements, whereby the rods extend transverse to the direction of movement of the conveyor belt and are connected with their flat ends to circulating, pull-resistant, flexible belt loops by screws, rivets etc. which penetrate the flat ends and the belt loops.

In the known conveyor belts of this type the ends of the rods are flattened and designed such that, in the direction of movement of the conveyor belt, they have leading and following edges extending transverse to the belt loops in a straight line. The bores required for fastening the rivets or screws in these flat ends result automatically in a weakening of the effective cross-section (cross-section of the metal) of the flat ends. Furthermore, the contact of these flat ends on the belt loops is unfavorable because the straight lateral edges of the flat ends cause notching within the belt loops.

It is therefore an object of the present invention to improve the aforementioned conveyor belt such that the fastening bores no longer result in undesirable weakening of the flat ends and that furthermore the aforementioned damaging notching effect of the lateral edges no longer occurs.

SUMMARY OF THE INVENTION

A conveyor belt for a conveying device according to the present invention is primarily characterized by:

Pull-resistant flexible belt loops, extending in a direction of movement of the conveyor belt;

Rods having opposed, flat ends provided with bores, the rods extending perpendicularly to the belt loops and resting with the flat ends on the belt loops;

Fasteners for securing the flat ends to the belt loops by penetrating the bores of the flat ends and the belt loops;

The flat ends having a leading edge and a following edge in the direction of movement;

The leading and the following edges having rounded projections in the area of the bores.

Advantageously, the leading and the following edges have additional projections in at least one area without bores.

Preferably, in the area of the bores the sum of a first distance between the rim of the bore and the projection at the leading edge and a second distance between the rim of the bore and the projection at the following edge is at least substantially equal to the minimal width of the flat end in the at least one area without bores.

Preferably, the sum of the first and second distances is 70% to 90% of the width of the flat ends in the at least one area without bores.

Advantageously, a cross-sectional area of the flat end of the first and the second distances is 70% to 90% of a cross-sectional area of the flat end taken at the width of the flat end in the at least one area without bores.

A cross-sectional area of the flat end of the first and second distances is at least substantially equal to the cross-sectional area of the flat end taken at the width of the flat end in the at least one area without bores.

Preferably, the flat ends comprise two of the bores and the leading edge and the following edge each have one additional projection.

The leading and following edges are preferably wave-shaped.

Advantageously, the wall thickness of the flat ends tapers in an outward direction transverse to the conveyor belt.

The flat ends preferably comprise two bores and the contour of the flat ends is mask-shaped.

According to the present invention, the leading and following edges of the flat ends in the area of the fastening elements (screws, rivets, etc.) are provided with projections. Thus, the following and leading edges no longer extend straight but, are curved at least over a portion of their length. This improves substantially the contacting behavior of the flat ends on the belt loops because the surface pressure is reduced and the danger of notching is thus considerably reduced. Especially expedient is an embodiment in which the cross-sectional areas of the flat ends in the area of the fastening elements, on the one hand, and the cross-sectional areas within the area between or adjacent to the projections, on the other hand, is at least substantially identical. (The term cross-sectional area in the context of the present invention corresponds only to the metallic portion of the flat end and does not include the cross-sectional area of the bore). However, it is also possible to design the flat ends such that their cross-sectional area is reduced in a direction toward the outer sides of the belt loops. In this case, the projections are dimensioned such that no discontinuities (jumps) within the different cross-sectional areas are present.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
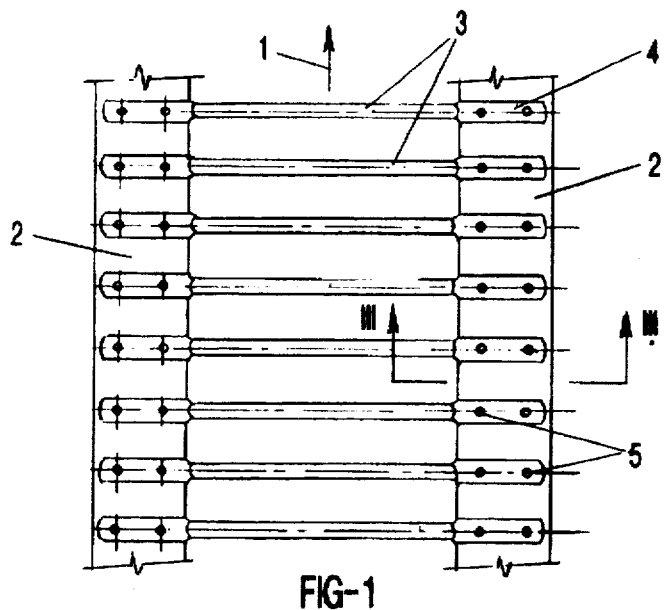
FIG. 1 is a partial plan view of a screen conveyor belt for agricultural implements.

The present invention will now be described in detail with the aid of several specific embodiments utilizing FIGS. 1 through 4.

The endless screen conveyor belt moved in the direction of arrow 1 and guided on drive and guide pulleys comprises two endless, pull-resistant belt loops 2 comprised of rubberized fabric and positioned at the outer sides of the conveyor belt. These belt loops serve to secure thereat transversely extending rods 3 made of steel etc. which are arranged at a distance from one another and which by their spacing define the degree of screening possible with the conveyor belt.

The rods 3 have flat ends 4 which rest on the belt loops 2. The fastening of the rods 3 is achieved with rivets 5 whereby two such rivets are provided for each flat end 4.

Figure 2:
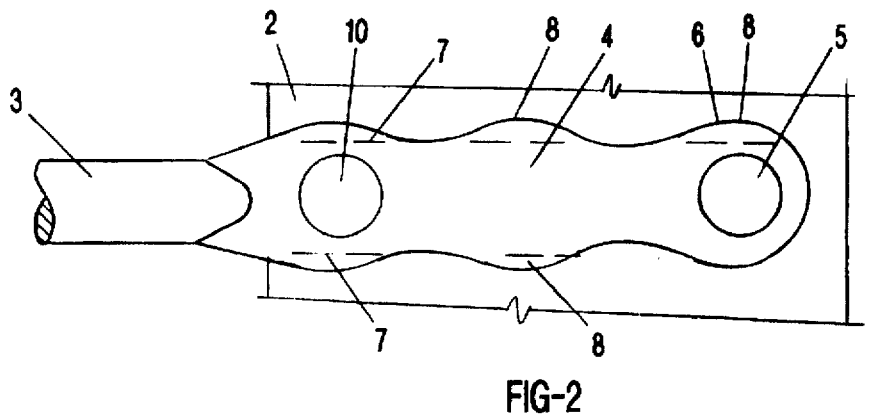
FIG. 2 is a plan view onto a fastening location of a rod on a belt loop in an enlarged representation.
Figure 3:
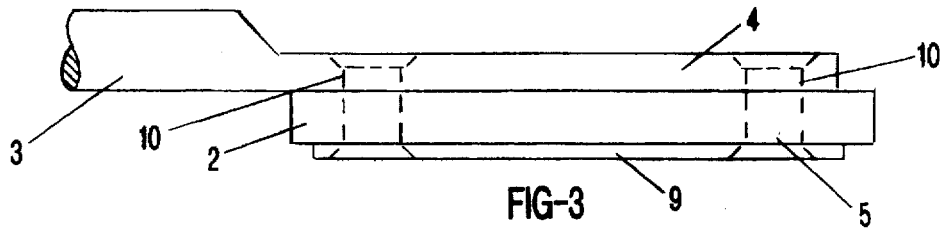
FIG. 3 shows the fastening location of FIG. 2 in a section according to line III—III of FIG. 1.

The flat ends 4 have no straight leading and following edges 6, indicated with a dashed line 7 in FIG. 2, but are provided with projections 8, i.e., outwardly curved protrusions, relative to the extension of the lines 7. Thus, overall, there results a substantially wave-shaped design of the leading and following edges 6, the contour of which depends on the size of the projection (i.e., the extension transverse to the straight line 7). This design has the great advantage that the edges 6 are comparatively longer than a straight edge so that the pressure exerted by the edges onto the belt loops is reduced.

The rivet 5 penetrates the flat ends 4, the belt loops 2 and a metal strip 9 positioned below the belt loop 2. For this purpose, the flat ends 4 comprise rivet bores 10.

It is important that the projections 8 are present within the area of the rivet bores 10. Thus, the flat ends 4 in this area are not weakened; instead, the cross-sectional area of the flat ends 4 in the risk area of the rivet bores 10 is enlarged relative to flat ends with straight edges such that the desired stiffness and stability is provided.

Figure 4:
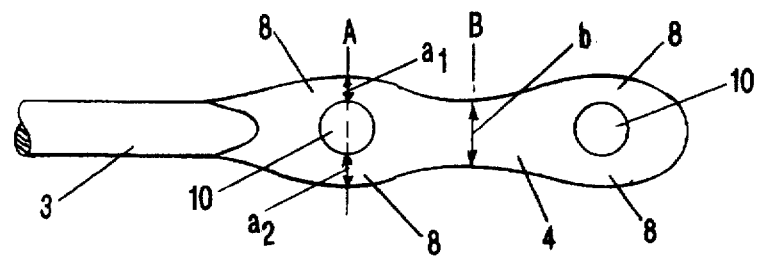
FIG. 4 is a different embodiment of a flat end in a plan view.

In the embodiment according to FIG. 4, each rivet hole 10 has coordinated therewith a projection 8, however, the area between the two rivet bores 10 is constricted so that the flat end 4 has a substantially mask-shaped contour in a top view.

It should be noted that the projections 8 are designed such that for the flat ends 4 along section line A there results a cross-sectional area that is at least approximately 70 to 90% of the cross-sectional area at B. The cross-section at the narrowest location (B) corresponds also at least substantially to the cross-sectional areas at A.

When the cross-sectional area of the flat ends 4 is reduced in the direction toward their free ends (outwardly relative to the conveyor belt), the cross-sectional area B is also reduced relative to the cross-sectional area at A. The cross-sectional area at the outwardly positioned rivet hole 10 is thus smaller than the cross-sectional area at B which is, in turn, smaller than the cross-sectional area at A. This cross-sectional change can be achieved by reducing the wall thickness of the flat end 4 in a slowly tapering manner toward the free end of the flat end 4. Furthermore, it is expedient to produce the rivet holes 10 by driving a drift etc. into the flat ends instead of boring the rivet bores 10. As can be seen in the drawings, the sum of the distances $a_1+a_2$ corresponds to the distance b.

The present invention is, of course, in no way restricted to the specific disclosure of the specification and drawings, but also encompasses any modifications within the scope of the appended claims.

What I claim is:

1. A conveyor belt for a conveying device, said conveyor belt comprising:

pull-resistant, flexible belt loops extending in a direction of movement of said conveyor belt;

rods having opposed, flat ends provided with bores, said rods extending perpendicularly to said belt loops and resting with said flat ends on said belt loops;

fasteners for securing said flat ends to said belt loops by penetrating said bores of said flat ends and said belt loops;

said flat ends having a leading edge and a following edge in said direction of movement;

said leading and said following edges having rounded projections in an area of said bores.

2. A conveyor belt according to claim 1, wherein said leading and said following edges have additional projections in at least one area without said bores.

3. A conveyor belt according to claim 2, wherein in said area of said bores a sum of a first distance between a rim of said bore and said projection at said leading edge and a second distance between said rim of said bore and said projection at said following edge is at least substantially equal to a minimal width of said flat end in said at least one area without said bores.

4. A conveyor belt according to claim 3, wherein said sum of said first and said second distances is 70% to 90% of said width of said flat ends in said at least one area without said bores.

5. A conveyor belt according to claim 4, wherein a cross-sectional area of said flat end of said first and said second distances is 70% to 90% of a cross-sectional area of said flat end taken at said width of said flat end in said at least one area without said bores.

6. A conveyor belt according to claim 3, wherein a cross-sectional area of said flat end of said first and said distances is at least substantially equal to a cross-sectional area of said flat end taken at said width of said flat end in said at least one area without said bores.

7. A conveyor belt according to claim 2, wherein said flat ends comprise two of said bores and wherein said leading edge and said following edge each have one of said additional projections.

8. A conveyor belt according to claim 1, wherein said leading and said following edges are wave-shaped.

9. A conveyor belt according to claim 1, wherein a wall thickness of said flat ends tapers in an outward direction transverse to said conveyor belt.

10. A conveyor belt according to claim 1, wherein said flat ends comprises two of said bores and wherein a contour of said flat ends is mask-shaped.

* * * * *